(12) United States Patent
Finn

(10) Patent No.: US 9,503,361 B2
(45) Date of Patent: Nov. 22, 2016

(54) ACTIVE/STATIC PATH REDUNDANCY

(71) Applicant: Cisco Technology, Inc., San Jose, CA (US)

(72) Inventor: Norman W. Finn, Livermore, CA (US)

(73) Assignee: Cisco Technology, Inc., San Jose, CA (US)

( * ) Notice: Subject to any disclaimer, the term of this patent is extended or adjusted under 35 U.S.C. 154(b) by 230 days.

(21) Appl. No.: 14/303,875

(22) Filed: Jun. 13, 2014

(65) Prior Publication Data

US 2015/0365319 A1    Dec. 17, 2015

(51) Int. Cl.
| | |
|---|---|
| *H04L 12/703* | (2013.01) |
| *H04L 12/24* | (2006.01) |
| *H04L 12/707* | (2013.01) |
| *H04L 29/14* | (2006.01) |
| *H04L 29/06* | (2006.01) |

(52) U.S. Cl.
CPC .......... *H04L 45/28* (2013.01); *H04L 41/0668* (2013.01); *H04L 45/24* (2013.01); *H04L 69/14* (2013.01); *H04L 69/40* (2013.01)

(58) Field of Classification Search
CPC ....... H04L 45/28; H04L 45/24; H04L 69/14; H04L 69/40; H04L 41/0654; H04L 41/0668
See application file for complete search history.

(56) References Cited

U.S. PATENT DOCUMENTS

| | | | |
|---|---|---|---|
| 8,363,662 B2 | 1/2013 | Thubert et al. | |
| 8,447,849 B2 | 5/2013 | Shaffer et al. | |
| 8,451,744 B2 | 5/2013 | Vasseur et al. | |
| 8,489,765 B2 | 7/2013 | Vasseur et al. | |
| 8,630,177 B2 | 1/2014 | Vasseur et al. | |
| 8,817,665 B2 | 8/2014 | Thubert et al. | |
| 9,100,329 B1* | 8/2015 | Jiang | H04L 45/28 |
| 2002/0075873 A1 | 6/2002 | Lindhorst-Ko et al. | |
| 2003/0147344 A1* | 8/2003 | Stewart | H04L 45/00 370/216 |
| 2007/0121486 A1* | 5/2007 | Guichard | H04L 45/02 370/216 |
| 2007/0165515 A1* | 7/2007 | Vasseur | H04L 12/66 370/216 |
| 2008/0222478 A1 | 9/2008 | Tamaki | |
| 2012/0155329 A1 | 6/2012 | Shaffer et al. | |
| 2012/0300668 A1 | 11/2012 | Thubert et al. | |
| 2013/0336107 A1* | 12/2013 | Vasseur | H04L 41/0654 370/218 |
| 2014/0006893 A1 | 1/2014 | Shetty et al. | |
| 2014/0025833 A1* | 1/2014 | Kiessling | H04L 45/28 709/228 |
| 2014/0040657 A1* | 2/2014 | Kiessling | H04L 12/40169 714/4.1 |
| 2014/0233422 A1 | 8/2014 | Thubert et al. | |
| 2014/0355416 A1* | 12/2014 | Keesara | H04L 45/127 370/219 |

(Continued)

FOREIGN PATENT DOCUMENTS

| | | |
|---|---|---|
| EP | 2249526 A1 | 11/2010 |
| WO | 2014/058936 A1 | 4/2014 |

OTHER PUBLICATIONS

Finn, Norman, "Features needed for seamless redundancy (P802.1CB)", Jul. 9, 2013, IEEE, pp. 1-25.*

(Continued)

*Primary Examiner* — Paul H Masur
(74) *Attorney, Agent, or Firm* — Merchant & Gould P.C.

(57) ABSTRACT

Delivering every packet of a stream simultaneously along two different paths gives a high assurance that the destination will receive at least one of them, even if a single failure occurs. The present idea uses the topology protocols to know when to regenerate a dual stream after one failure occurs, so that the dual delivery, and thus assurance against further failures, is maintained.

19 Claims, 10 Drawing Sheets

(56) References Cited

U.S. PATENT DOCUMENTS

2014/0369186 A1* 12/2014 Ernstrom ............ H04L 41/0668
370/228
2015/0023328 A1 1/2015 Thubert et al.

OTHER PUBLICATIONS

Finn, Norman, "Failure rates and P802.1CB", Oct. 29, 2013, IEEE, pp. 1-21.*
International Search Report & Written Opinion dated Aug. 26, 2015, PCT/US2015/034726 filed Aug. 6, 2015, pp. 1-13.
Rentschler et al., "The Parallel Redundancy Protocol for Industrial IP Networks," Industrial Technology (ICIT), 2013 IEEE International Conference on, IEEE, Feb. 25, 2013, pp. 1404-1409.
U.S. App. No. 14/020,936, filed Sep. 9, 2013 entitled "OAM and Time Slot Control in a Deterministic ARC Chain Topology Network" (Not at M&G).
Atlas et al., "An Architecture for IP/LDP Fast-Reroute Using Maximally Redundant Trees," draft-ielf-rtgwg-mrt-frr-D architecture-03, Jul. 12, 2013, The Internet Society, Reston, VA, USA (29 pgs.).
Awduche et al., "RSVP-TE: Extensions to RSVP for LSP Tunnels," RFC 3209, Dec. 2001, The Internet D Society, Reston, VA (61 pages).
Bocci et al . . "A Framework for MPLS in Transport Networks." RFC 5921, Jul. 2010, The Internet Society, Reston, D VA, USA (56 pgs.).
Braden et al., "Resource ReSerVation Protocol (RSVP)—Version 1 Functional Specification," RFC 2205, D Sep. 1997, The Internet Society, Reston, VA, USA (112 pages).
Deterministic Ethernet, IEEE 802.1 standards for real-time process control, industrial automation, and vehicular networks, available at http://www.ieee802.org/802_tutorials/2012-11/8021-tutorial-final-v4.pdf, Nov. 12, 2012, IEEE, New York, NY (72 pgs.).
Farrel et al., "A Path Computation Element (PC E)-Based Architecture," RFC 4655, The Internet Society, Reston, VA (40 pgs.).
Goyal et al., "Reactive Discovery of Point-to-Point Routes in Low-Power and Lossy Networks," RFC 6997, Aug. D 2013, The Internet Society, Reston, VA, USA (40 pgs.).
Le Faucheur, Resource Reservation Protocol (RSVP) Extensions for Path-Triggered RSVP Receiver Proxy, RFC D 5946, Oct. 2010, The Internet Society, Reston, VA, USA (35 pgs.).
Media Access Control (MAC) Bridges and Virtual Bridge Local Area Networks, IEEE Sid 802.1QTM_2011, Aug. 31, D 2011, IEEE Computer Society, IEEE, New York, NY (1365 pgs.).
Part 15.4: Low-Rate Wireless Personal Area Networks (LR-WPANs) Amendment 1: MAC sublayer, IEEE Sid D 802.15.4e TM_2012, Apr. 16, 2012, IEEE Computer Society, IEEE, New York, NY (225 pgs.).
Ripphausen-Lipa et al., "The Vertex-Disjoint Menger Problem in Planar Graphs," SODA '93 Proceedings of the Fourth Annual ACM-SIAM Symposium on Discrete Algorithms, Society for Industrial and Applied Mathematics, Philadelphia, PA, 1993 (8 pgs.).
Thubert et al, "Applying Available Routing Constructs to bicasting," drafl-thubert-rtgwg-arc-bicasl-00, Oct. 11, D 2012, The Internet Society, Reston, VA, USA (10 pgs).
Thubert et al, "Available Routing Constructs," drafl-thubert-rtgwg-arc-00, Oct. 2, 2012, The Internet Society, D Reston, VA, USA (19 pgs.).
Thubert et al., "IETF 6TSCH: Combining IPv6 Connectivity with Industrial Performance," 2013 Seventh International Conference on Innovative Mobile and Internet Services in Ubiquitous Computing (IMIS), IEEE, New York, NY, Jul. 2013 (6 pgs.).
Vasseur et al., "Path Computation Element (PCE) Communication Protocol (PCEP)," RFC 5440, Mar. 2009, The D Internet Society, Reston, VA, USA (87 pgs.).
Wang et al., "6tus Layer Specification," drafl-wang-6tsch-6tus-01, May 23, 2013, The Internet Society, Reston, VA, D USA (56 pgs.).
Watteyne et al., "Using IEEE802.15.4e TSCH in an LLN context: Overview, Problem Statement and Goals," draft-watteyne-6tsch-tsch-lln-context-02, May 23, 2013, The Internet Society, Reston, VA (23 pgs.).
Winter et al.. "RPL: 1Pv6 Routing Protocol for Low-Power and Lossy Networks," RFC 6550, Mar. 2012, The D Internet Society, Reston, VA, USA (157 pp.).
Yasukawa et al., "Operations and Management (OAM) Requirements for Point-to-Multipoint MPLS Networks," D RFC 4687, Sep. 2006, The Internet Society, Reston, VA, USA (14 pgs.).

* cited by examiner

ACTIVE/STATIC PATH REDUNDANCY

TECHNICAL FIELD

The present disclosure relates generally to network reliability, specifically through the usage of active and static path redundancy.

BACKGROUND

Delivering every packet of a stream can provide assurance that the destination will receive at least one of them, even in the occurrence of a single failure. However, further failures may be possible even if a single failure occurs. There exists a need to elegantly deal with the possibility of multiple failures by utilizing network node intelligence to increase effectiveness of active/static redundancy to increase the reliability of the network for applications that demand ultra-low packet loss rates.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1:
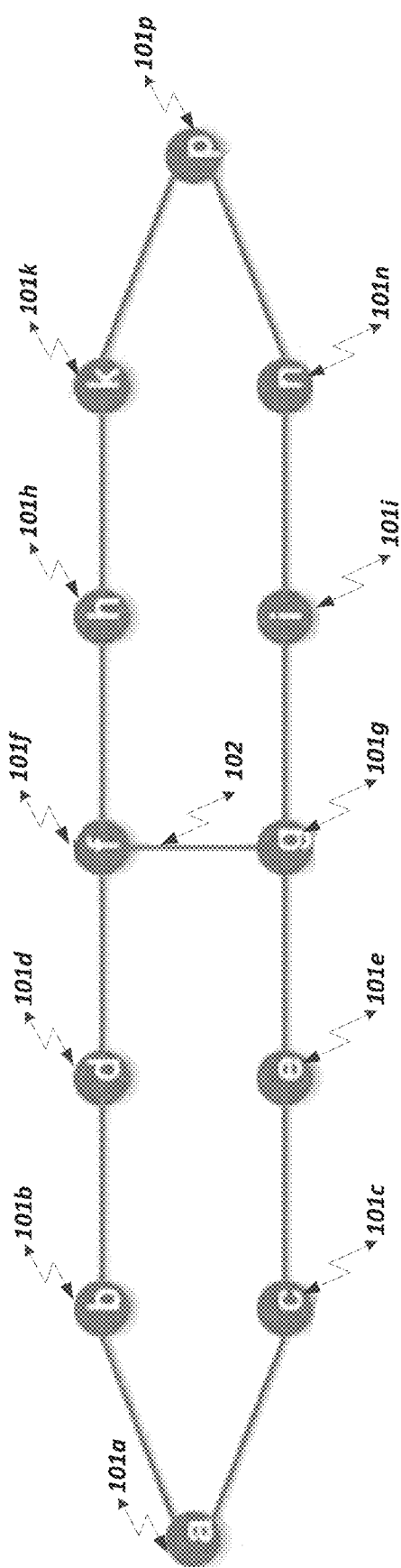
FIG. 1 illustrates a sample network topology that illustrates one example of two nailed up paths with an extra path in place.

Methods and system may be provided to provide high assurance that when delivering every packet of a stream simultaneously along two separate paths at least one of them will be received by the desired destination regardless of one or more failure conditions along the data paths. Embodiments of the present disclosure may use the network topology protocols to learn when to regenerate a dual stream after a first failure occurs. This may ensure the maintenance of dual delivery which in turn provides assurance against further failures that may occur.

Both the foregoing overview and the following example embodiment are examples and explanatory only, and should not be considered to restrict the disclosure's scope, as described and claimed. Further, features and/or variations may be provided in addition to those set forth herein. For example, embodiments of the disclosure may be directed to various feature combinations and sub-combinations described in the example embodiment.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Certain applications, such as television studio and other real-time control applications (such as real-time conferencing applications) may require a demand for ultra-low packet loss rates. The applications may include, for example, but not limited to deterministic networks, such as those used with virtual private networks. Ultra low packet loss rates may be, but are not limited to, loss rates ranging from $10^{-6}$ to $10^{-12}$, or potentially even lower.

Packet loss may be defined in two non-limiting categories: single failures and availability failures. Single failures may, for example, affect a single or only a few packets per failure event. Congestion is one cause for such single failures resulting in packet loss. Congestion may occur on wired networks when a forwarding node (bridge, router, or other non-limiting network device) lacks sufficient buffer memory space to accommodate a received packet for subsequent forwarding. When the network device lacks such buffer space, the received packet may have to be dropped and does not continue on the path to the desired destination.

In such a wired network scenario, the transmission rate may be limited by any number of chance events. Such chance events may occur in the medium or the forwarding devices themselves. The chance events may include but are not limited to, cosmic rays, power fluctuations, electromagnetic interference, and other such rate-limiting events. The transmission limiting effects may be similar in wireless networks as well, when such networks deal with congestion.

Alternatively, availability failures may occur when there is a failure of a network device (node), an individual component of the network device, or a failure of the transmission medium itself that may render the particular network device unable to forward packets. Depending on the severity of the availability failure, the network device may be unable to forward packets from a period consisting of a matter of seconds to a matter of days or more.

It should be understood that while availability and single failure are described herein, failures at intermediate rates are also possible and considered in this disclosure. For example, failures at intermediate rates may be handled in some embodiments by various heuristics that can identify excessive single failures, and in some cases subsequently trigger a purposeful availability failure.

Approaches to achieve ultra-low packet-loss may include the concept of simple multipathing. In simple multipathing the same data packet travelling to a destination is sent on more than one path from the source to the destination. Ideally, the multipathing may send the same packet (original and replicated) on the separate paths on a near-simultaneous manner. Extra copies of the packet received at the destination may be subsequently discarded. In various embodiments, a network forwarding device located near the source of the packet may be responsible for replicating packets to be sent to the destination. Similarly, a network device located near the destination may be responsible for deleting received duplicate packets.

Based on the number (N) of duplicative paths used in any given embodiment, then the failure to deliver any given packet on N−1 of those paths can be tolerated. A typical solution in some embodiments may be to use two paths based on hardware and other cost considerations. The effectiveness of simple multipathing may decrease as the network size increases. This is due to the chances of simultaneous failures along all paths may increase.

In most instances, chance physical errors tend to be uncorrelated over the multiple (N) paths. Thus, the rate of chance errors is usually low enough to meet the network requirements without additional multipathing. The square of this level of failure rate usually leaves suitable network conditions. Alternatively, with availability errors, the square of the failure rate may not be low enough to satisfy demanding users. Embodiments of the present disclosure, discuss a way of forwarding on multiple paths to handle more than one failure.

Similarly, for congestion errors, typical multipathing may prove to be unhelpful. This is since when a significant proportion of the data is duplicated, it may be possible for it to encounter congestion on both of the duplicate paths. Embodiments of the present disclosure work to eliminate problems that may result from such congestion errors.

Traditional routing and bridging to create data paths from source to destination are not sufficient to address the failure problems described above. For example, when two or more paths are created for a stream, each of the paths may utilize an active topology provided by a bridging or network protocol such as Intermediate System to Intermediate System ("ISIS"). If the network topology changes, for example when a network link is brought down or added to the topology, then the routing protocol must reconverge. During such a reconvergence process, is may be possible that each of the paths can be interrupted and lose all traffic for a period of time. Packets may be lost any time there is such a failure and subsequent recovery on a network path.

Such problems may require the so called "nailing up" of network paths, in a fashion that traditional routing and bridging does not account for. Nailed up paths attempt to keep the paths "permanently" available. This is true only in the sense that when one path goes down, the second path can transmit data packets from the source to the destination. Simple nailing of paths may not be sufficient to handle multiple failures of network devices on the data paths.

Three or more paths may be nailed up to attempt to ensure the safe transmission of data. For example, with three paths, the failure rate may become the cube of each path's data transmission rate. However, this may take at least 50% more hardware than would a two-path solution. The addition of multiple paths inherently requires more hardware and more cost for the installation, this becomes impractical as a solution when cost is an object. Furthermore, as the two-path solution is also often a ring, which represents the minimum amount of hardware necessary for connectivity. For example, the ring topography carries only a bandwidth penalty equal to simply using a single path.

In many implementations, a ring network may be a local area network (LAN) in which the nodes (workstations or other network devices) are connected in a closed loop configuration. Adjacent pairs of nodes may be directly connected. Other pairs of nodes are indirectly connected with the data passing through one or more intermediate nodes to travel from source node to destination node. Such connections may be wired or wireless links.

The ring topology may prove useful when system requirements are modest and workstations are at scattered points. If the workstations are reasonably close, the cost can be lower than that of other topologies when cable routes are chosen to minimize the total length of cable needed. Of course, such an approach is inappropriate for providing an ultra-low packet rate loss for real-time applications such as television broadcasting.

To wit, a break in the cable of a ring network may result in degraded data speed between pairs of workstations for which the data path is increased as a result of the break. If two breaks occur and they are not both in the same section of cable, some workstations will be cut off from some of the others. This problem is avoided by embodiments of the present disclosure.

Another proposed solution is implemented in the International Organization for Standardization/International Electrotechnical Commission ("ISO/IEC") 62439-3 which describes both Parallel Redundancy Protocol ("PRP") and High-availability Seamless Redundancy ("HSR"). PRP and HSR are protocols that may be used together in a network consisting of a plurality of rings that may be connected into a macro-tree via pairs of network connection devices (so-called "Quadboxes") that each may make a ring to ring connection. In the resulting connected ring network, one failure on each ring or one failure on each pair of Quadboxes may be tolerated without completely interrupting connectivity.

Quadboxes allow for a slight improvement over a simple ring topography, but not by a significant degree. For example, dividing a large ring into two rings connected by Quadboxes may improve the delivery rate by a factor of two. Similarly, breaking the ring into three connected ring structure provides a third on the single ring failure rate.

Quadboxing may also provide complexity issues. For example, every Quadbox requires separate states both to handle the replication of packets and to discard excess replicated packets for each stream. In particular, this approach employs a function that discards excess replicated packets, wherein the function requires that every critical stream packet carry a sequence number. The sequence number must then be subsequently tracked by the replication deletion units present in each Quad Box. Clearly, this makes the deletion of extra replicated packets more complex.

In the case of high-speed streams (i.e. real-time applications), the duplicate replication packet elimination function requires detailed history keeping, adding another undesired level of complexity to the design of each network device. The use of the stream sequence numbers may make it very difficult to create a solution that works for path which are both bridged and routed, by requiring an L2 tag with information that does not get routed and an L3 encapsulation of that same information which is not easily visible to bridge devices.

Another standards project that applicability to solving the problem of packet loss is Institute of Electrical and Electronics Engineers ("IEEE") P802.1CB-Frame Replication and Elimination for Reliability. This standard specifies procedures, managed objects and protocols for bridges and end stations that provide: 1) identification and replication of frames, for redundant transmission; 2) identification of duplicate frames; and 3) elimination of duplicate frames. More specifically, P802.1 CB provides for "seamless redundancy" similar to the ISO/IEC 62439-3 solution where nodes (devices) in a network are attached by two ports. A source node may then send the same frame over both ports. A destination node should then receive, in the fault-free state, two identical frames within a certain time skew. The destination node may forward the first frame to the application and discard the second frame when (and if) it comes. A sequence number is used to recognize such duplicates. P802.1 CB suffers from many of the same complexity issues as the ISO/IEC 62439-3 solution which embodiments of the present disclosure avoid.

Another unsatisfactory approach to reduce packet loss to an ultra-low level is the White Rabbit Project at the European Organization for Nuclear Research ("CERN") (collectively, "White Rabbit") which "aims to combine the real-time performance of industrial networks and flexibility of Ethernet with the accuracy of dedicated timing systems". In effect White Rabbit attempts to nail up multiple paths as discussed above. Whenever a path fails, a standard routing protocol (in this case, an 802.1 spanning tree) may be employed to quickly find a different route for that path, without affecting the first path. This is accomplished by having two separate physical networks, each running separate spanning trees. With White Rabbit, the mean time to repair ("MTTR") a failed path is typically sub-second, instead of hours, while the mean time to failure ("MTTF") is unchanged from a simple multipath scheme. The low MTTR means that only one path is relied upon for a very brief time before the second path restores the duplicate delivery. This gets the total failure rate down to the square of the two spanning tree networks' rates.

However, the cost in equipment for White Rabbit is large. Practically speaking, four physical paths must be available at all times, a normal and alternate path on each of two networks. This scheme could be modified to use no more networks nodes that the simple multipath scheme. One could reroute the failed path over other routes quickly using ordinary bridging or routing techniques. But, the result still requires excess bandwidth to cover the shifted loads. In effect, it is not much better than having three or four static paths to start with and the additional overhead makes this solution inferior to embodiments of the present disclosure.

Multiprotocol Label Switching ("MPLS") is a technology designed for speeding up network traffic flow and making it easier to manage. MPLS provides a mechanism for a fast reroute (also called MPLS local restoration or MPLS local protection) to serve as a local restoration network resiliency mechanism. The fact reroute is a feature of resource reservation protocol ("RSVP") traffic engineering to reconfigure a data path after the failure of a primary path is detected. In MPLS fast reroute each label switched path (LSP) passing through a facility is protected by a backup path which originates at the node immediately upstream to that facility. Fast reroute may provide faster recovery because the decision of recovery is strictly local.

One problem with MPLS fast rerouting is that some packets are lost every time a failure occurs during the reconfiguration of the path. To avoid such packet loss, dual delivery over two MPLS fast reroute paths may be employed (similar to White Rabbit), which again proves to be a costly approach in terms of equipment cost and network resources as compared to embodiments described in the present disclosure Consistent with embodiments of the present disclosure, methods and systems described herein may provide for delivering every packet of a stream simultaneously along two different paths to give a high assurance that the destination will receive at least one of them, even if a single failure occurs. Topology protocols may be used to know when to regenerate a dual stream after one failure occurs, so that the dual delivery, and thus assurance against further failures, is maintained. These described embodiments can provide ultra-low packet loss for real-time applications without the problems associated with prior attempted solutions.

Embodiments of the present disclosure may be thought of as an active/static redundancy approach to avoid packet loss. The "static" part of embodiments may include two nailed-up paths through a network that has extra links available. The "active" part of present embodiments means that if one of the nailed-up paths fails, a node that is connected to an extra link may start replicating its copy of the data stream. This results in the re-creation of multiple paths, which protects against a second failure.

FIG. 1 illustrates a sample network topology that illustrates one example of two nailed up paths with an extra path in place. The topography described in FIG. 1 will be used in the following description to illustrate embodiments of the present disclosure.

The described network topology may exist in a networking environment 100. While networking environment 100 is depicted as a wired network environment, a wireless network environment is also consistent with embodiments of the disclosure. For example, networking environment 100 may be any type of system that transmits data packets over a network. As an example, networking environment 100 may be an environment enabled to provide voice communications, and video and data services.

Networking environment 100 may be based on a bi-directional transfer of packet based service, such as Internet Protocol (IP) traffic, between any number of network devices. Networking environment 100 may further include a plurality of gateways (not shown), for example, but not limited to cable modems, routers, switches, set top boxes, and computers. Networking environment 100 may include any combination of wide area networks (WANs), local area networks (LANs), or wireless networks suitable for packet-type communications, such as Internet communications.

Networking environment 100 may comprise a number of network devices 101a-p. Network devices 101a-p may be routers, bridges, or other network devices capable of receiving and transmitting a data stream from a source network device (here, 101a) to a destination network device (here, 101p). Network devices generally are discussed in further detail in regards to FIG. 8.

Networking environment 100 may be designed to transmit a stream of data packets from network device 101a to network device 101p. The data packets may be related to a real-time application where ultra-low packet loss is desired, such as television broadcast. As can be seen, there are two static paths upon which packets can travel to traverse from network device 101a to network device 101p. The extra path 102, as illustrated here, may connect network device 101f and network device 101g.

Figure 2:
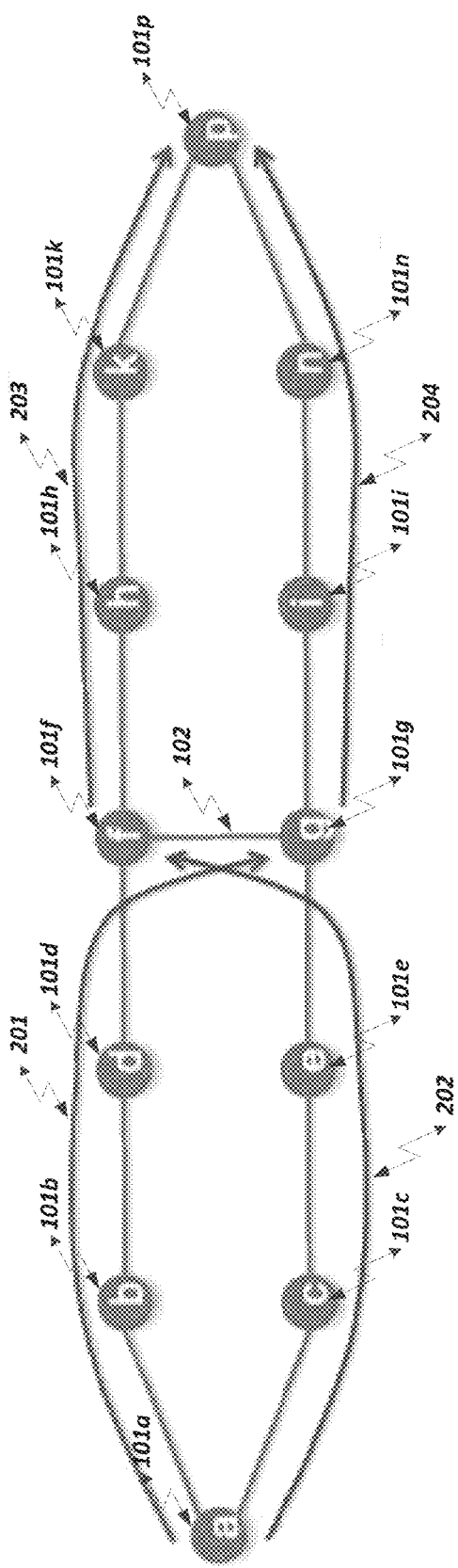
FIG. 2 illustrates network environment 100 as it may be employed by the described ISO/IEC/IEEE proposed solutions.

FIG. 2 illustrates network environment 100 as it may be employed by the described ISO/IEC/IEEE proposed solutions as described above. A data stream may be desired to be traversed from network device 101a to network device 101p. Network device 101a may replicate each data packet in the stream such that two copies of each packet of the stream may be sent destined for network device 101p.

One copy of each packet may begin its traversal on path 201 through transmission from network device 101a to network device 101b. This first data packet may continue on path 201 from network device 101b to network device 101d and then from network device 101d to network device 101f. Similarly, the second data packet may traverse path 202 from network device 101a to network device 101c. This first data packet may continue on path 202 from network device 101c to network device 101e and then from network device 101e to network device 101g. As such, in typical operation, network device 101f and network device 101g will each receive at least one copy of the data packet, discard any extras of that packet and continue traversal of one packet to the destination.

As can be seen, the second network packet is provided from network device 101g to network device 101f. If network device 101f receives the first network packet first, network device 101f may forward the first network packet to network device 101h on path 203. A replicated copy of the first network packet may be sent to network device 101g. Subsequently received copies of the packet (i.e., the second network packet provided by network device 101g) will be discarded.

The first network packet will subsequently traverse path 203 from network device 101h to network device 101k. From network device 101k, the first network packet is then provided to the destination (network device 101p). The replicated copy of the first network packet will first be provided to network device 101g and will subsequently traverse path 204 from network device 101g to network device 101i. From network device 101i, the replicated copy of the first network packet is then provided to network device 101n. Network device 101n then provides the replicated copy of the first network packet to the destination (network device 101p).

If network device 101f receives a replicated copy of the second network packet from network device 101g before the corresponding first network packet, network device 101f will send the replicated copy of the second network packet through path 203 to network device 101h. The replicated copy of the second network packet will subsequently traverse path 203 from network device 101h to network device 101k. From network device 101k, replicated copy of the second network packet is then provided to the destination (network device 101p). Subsequently received copies of the packet (i.e., the first network packet provided by network device 101d) will be discarded. Network device 101g further may send the original second network packet through to network device 101i on path 204. From network device 101i, the second network packet is then provided to network device 101n. Network device 101n then provides the second network packet to the destination (network device 101p).

In either case, network device 101p will receive two copies of the network packet and may process one copy while discarding the other. The link 102 between network device 101f and network device 101g may carry twice as much traffic as the other links between network devices. Accordingly, in some embodiments of the present disclosure, link 102 may be an aggregate of two links.

Figure 3:
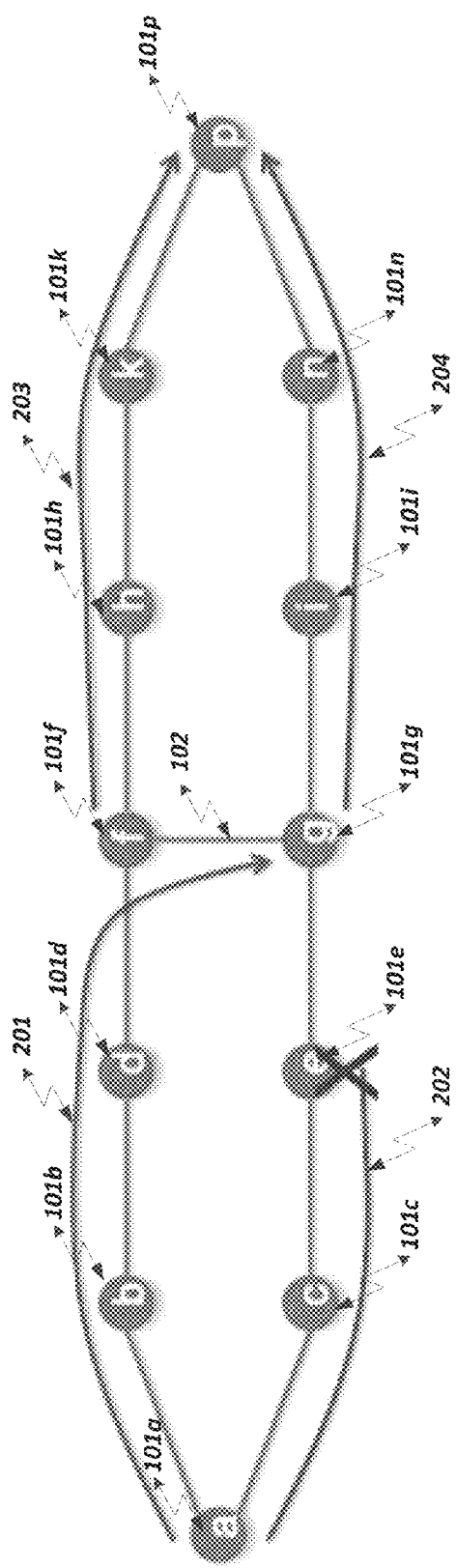
FIG. 3 illustrates network environment 100 as it may be employed by the described ISO/IEC/IEEE proposed solutions after network device 101e has failed due to a chance event or for any other non-limiting reason.

FIG. 3 illustrates network environment 100 as it may be employed by the described ISO/IEC/IEEE proposed solutions as described above after network device 101e has failed due to a chance event as described above or for any other non-limiting reason. As can be seen, the failure of network device 101e breaks the connectivity between network device 101e and network device 101g. In this instance, network device 101f will send a replicated copy of the first network packet from path 201 to network device 101g. Network device 101g further may send the replicated copy of the first network packet through to network device 101i on path 204. From network device 101i, the replicated copy of the first network packet is then provided to network device 101n. Network device 101n then provides the replicated copy of the first network packet to the destination (network device 101p).

Correspondingly, network device 101f will also transfer the first network packet along path 203 to network device 101h. The first network packet will subsequently traverse path 203 from network device 101h to network device 101k. From network device 101k, the first network packet is then provided to the destination (network device 101p). The result of this approach allows for any of network devices 101h, 101i, 101k, or 101n to die and still maintain connectivity from source (network device 101a) to destination (network device 101p).

Figure 4:
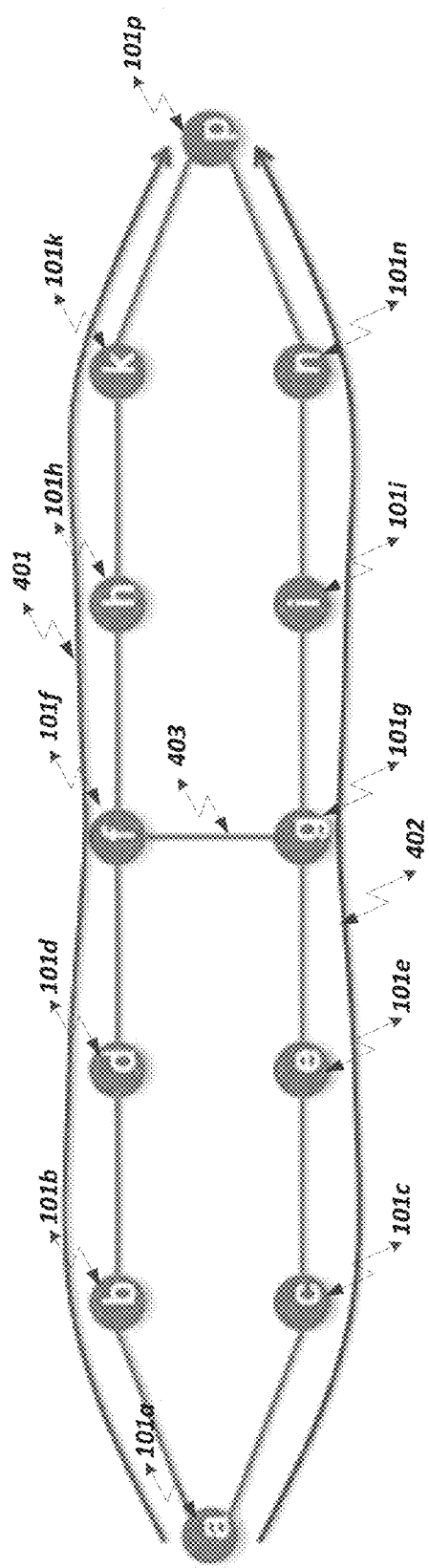
FIG. 4 illustrates network environment 100 as it may be employed by embodiments of the present disclosure.

FIG. 4 illustrates network environment 100 as it may be employed by embodiments of the present disclosure. A data stream may be desired to be traversed from network device 101a to network device 101p. Network device 101a may replicate each data packet in the stream such that two copies of each packet of the stream may be sent destined for network device 101p.

One copy of each packet may begin its traversal on path 401 through transmission from network device 101a to network device 101b. This first data packet may continue on path 401 from network device 101b to network device 101d and then from network device 101d to network device 101f. In normal operation, the first data packet may continue on path 401 from network device 101f to network device 101h and then from network device 101h to network device 101k. Finally, the first data pack may continue from network device 101k to the destination (network device 101p).

Similarly, the second data packet may traverse path 402 from network device 101a to network device 101c. This first data packet may continue on path 402 from network device 101c to network device 101e and then from network device 101e to network device 101g. In normal operation, the first data packet may continue on path 402 from network device 101g to network device 101i and then from network device 101i to network device 101n. Finally, the first data packet may continue from network device 101n to the destination (network device 101p). Network device 101p receives the two copies of the packet created at network device 101a. Network device 101p may then drop one packet and process the other packet. In normal operation, the link 403 between network device 101f and 101g need not be used.

Figure 5:
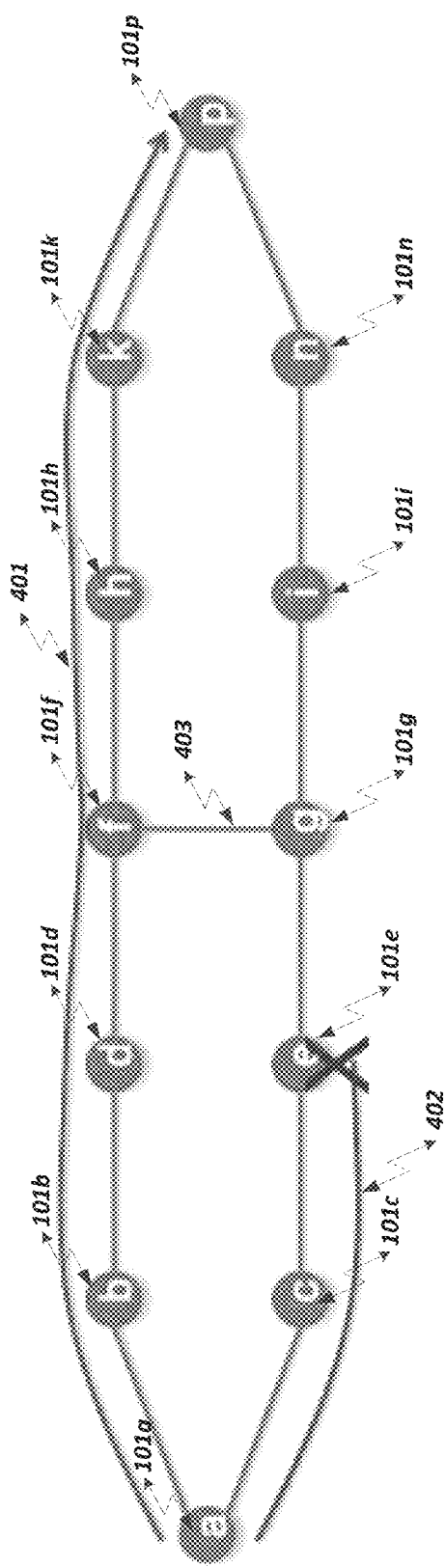
FIG. 5 illustrates network environment 100 as it may be employed by embodiments of the present disclosure after network device 101e has failed due to a chance event or for any other non-limiting reason.

FIG. 5 illustrates network environment 100 as it may be employed by embodiments of the present disclosure after network device 101e has failed due to a chance event as described above or for any other non-limiting reason. As can be seen, the failure of network device 101e breaks the connectivity between network device 101e and network device 101g. In these embodiments, a network protocol such as ISIS may send a message to each of the network devices on the path to notify the network devices that network device 101e has failed. Although ISIS protocol is described in conjunction with these described embodiments, this disclosure contemplates any suitable messaging protocol by which network devices may be alerted of the failure of a connected network device on the same data path.

In this case, it is assumed that network device 101f was previously designated as the device to implement packet loss avoidance procedures upon receipt of the message indicated failure of network device. As such, network device 101f knows what actions to take in response to receiving the ISIS message indicating the failure of network device 101e.

Figure 6:
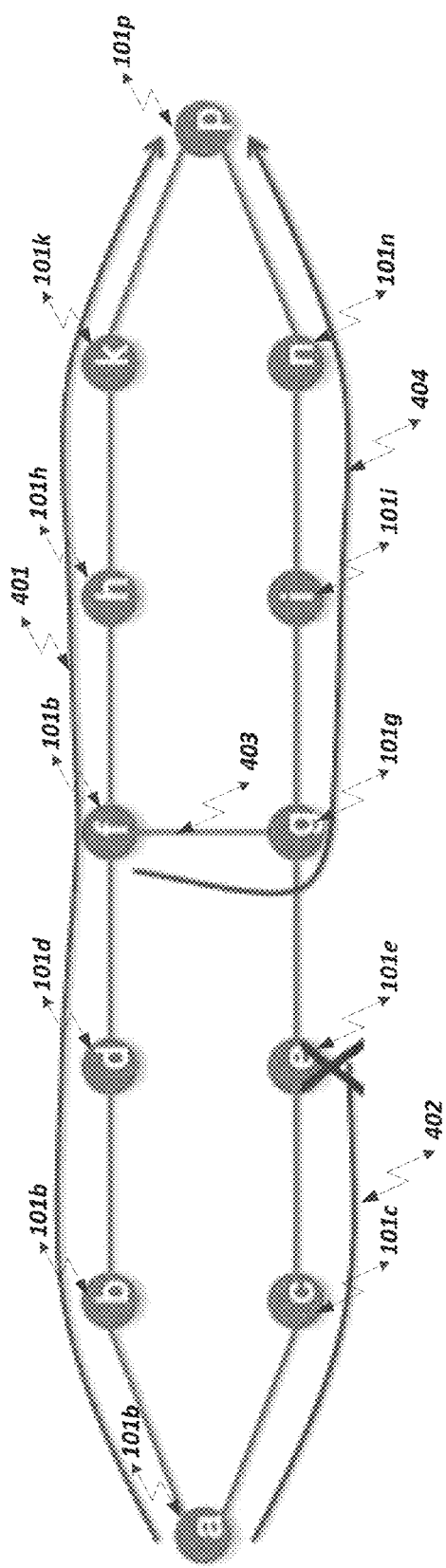
FIG. 6 further illustrates network environment 100 as it may be employed by embodiments of the present disclosure after network device 101e has failed due to a chance event or for any other non-limiting reason.

Specifically, subsequent to the receipt of the ISIS message, network device 101f begins to replicates packets received on path 401 from network device 101d. Turning to FIG. 6, it can be seen that the replicated packets from path 401 are transmitted from network device 101f to network device 101g over link 403. The replicated packets continue from network device 101g on path 404 to network device 101i and then from network device 101i to network device 101n. Finally, the replicated data packet may continue from network device 101n to the destination (network device 101p). In some embodiments of the present disclosure path 403 was designated as the emergency data path in the event of network device failure. The knowledge of the emergency data path may also be known by network device 101f.

While the replicated packet may be sent from network device 101f to network device 101g, the original packet from path 401 continues on path 401 from network device 101g through to network device 101i on path 401. From network device 101i, the original network packet is then provided to network device 101n. Network device 101n then provides the original network packet to the destination (network device 101p). The result of this approach allows for any of network devices 101h, 101i, 101k, or 101n to die and still maintain connectivity from source (network device 101a) to destination (network device 101p).

Embodiments of the present disclosure require some level of stream configuration for proper operation to prevent packet loss. Such configuration may be done manually by an individual, such as a network administrator, or alternatively may be configured by a program which can take into account network conditions for the selection of emergency paths and delegation of network devices capable of replicating packets and adding new flows as necessary. No additional signaling outside of the ISIS failure message is necessary for operation of embodiments of the present disclosure.

In embodiments of the present disclosure, the extra (emergency) link (network device 101f to network device 101g) normally carries no traffic unlike prior solutions described above. This may be true for any other link designated for use only when needed. Prior solutions carries twice the normal traffic at all times on these links, and may require a 2-link aggregation to handle the traffic. In the prior solutions such as the I/I/I solution, network devices 101f and 101g require per-stream duplicate recognition and a discard state and the additional hardware to drive it. None of this is required in embodiments of the present disclosure. Because in present embodiments, only the final destination (e.g., network device 101p) needs to discard duplicates. As such the L2 tag may be eliminated allowing the application or transport protocol to handle how to eliminate duplicates. This eliminates the L2/L3 translation problems that make prior solutions awkward. Present embodiments allow data to be delivered on two paths, so that a second failure will not prevent the final destination (e.g., network device 101p) from receiving at least one copy of every packet.

Figure 7:
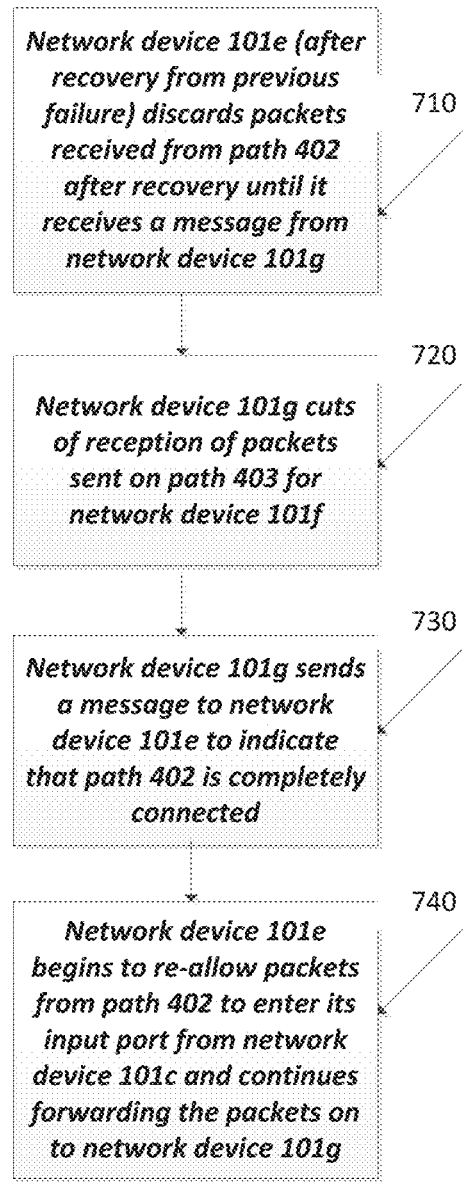
FIG. 7 is a flow chart illustrating operation of embodiments of the present disclosure when employed for data streams that use reserved bandwidth.

FIG. 7 is a flow chart illustrating operation of embodiments of the present disclosure when employed for data streams that use reserved bandwidth. When reserved bandwidth is employed, there may be an issue when the broken node (e.g., network device 101e) is restored back to use from its failure position. Network device 101g must switch from one input (e.g., network device 101f) to the previous input (e.g., restored network device 101e), to return to normal operation. Depending on the details of the particular data packet flow, it may be possible that when the switch from network device 101f back to network device 101e is made that network device 101g may send duplicates of a particular packet. This may be due to the particular packet having been received from both network device 101f and network device 101e.

Receipt of duplicate packets in the described scenario may lead to the filling of one or more buffers storing packets for transmission. This may result in the rate-limited stream to discard a packet at a later time to meet the rate-limiting confines. Method 700 illustrates embodiments of employing control events to prevent bandwidth overflow in the described scenario.

Method 700 may begin at step 710 where network device 101e (after recovery from previous failure) discards packets received from path 402 after recovery until it receives a message from network device 101g. The message indicates that network device 101g is now ready to continue receiving packets on path 402 from network device 101e.

Method 700 may subsequently proceed to step 720 when network device 101g learns that network device 101e is back to being operational. At step 720, network device 101g may cut of reception of packets sent on path 403 for network device 101f. Next, method 700 may proceed to step 730 where network device 101g may send a message to network device 101e. The message may indicate that path 402 is completely connected and that packets may be transmitted in a normal fashion. Subsequently, method 700 may proceed to step 740. At step 740, network device 101e may begin to re-allow packets from path 402 to enter its input port from network device 101c and then continue forwarding the packets on to network device 101g.

Figure 8:
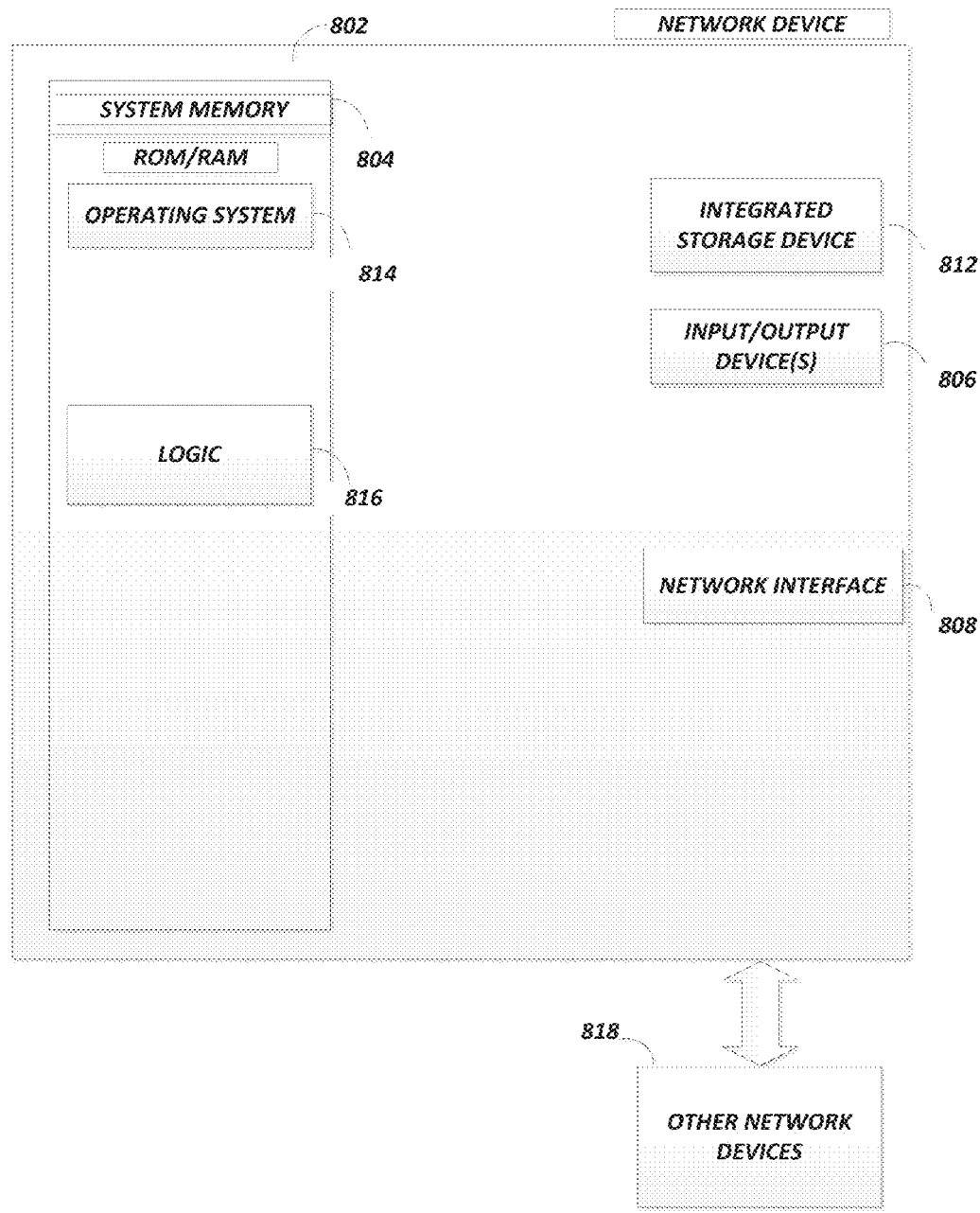
FIG. 8 shows a network device (such as network devices 101a-p) in greater detail.

FIG. 8 shows a network device (such as network devices 101a-p) in greater detail. A network device may include a processing device 802, a memory 804, input/output (I/O) devices 806, and a network interface 808, each of which is communicatively coupled via a local interface (not shown). Processing device 802 may be a hardware device for executing software, particularly that which is stored in memory 804. Processing device 802 may be any custom made or commercially available processor, a central processing unit (CPU), an auxiliary processor among several processors, a semiconductor-based microprocessor (in the form of a microchip or chip set), a microprocessor, or generally any device for executing software instructions.

Network interface 808 may include one or more devices that communicate both inputs and outputs, for instance but not limited to, a modulator/demodulator (modem for accessing another device, system, or network), a radio frequency (RF) transceiver or other type of transceiver, a telephonic interface, a bridge, a router, etc.

I/O devices 806 may include input devices, for example but not limited to, a keyboard, mouse, scanner, microphone, etc. Furthermore, the I/O devices 806 may also include output devices, for example but not limited to, a printer, display, etc.

The local interface may be, for example but not limited to, one or more buses or other wired or wireless connections. The local interface may have additional elements, which are omitted for simplicity, such as controllers, buffers (caches), drivers, repeaters, and receivers, to enable communications. Further, local interface 810 may include address, control, and/or data connections to enable appropriate communications among the aforementioned components and provides the interface to communicate with a network controller (not shown).

In some embodiments, a network device may further be configured with an integrated storage device 812 coupled to local interface 810. Storage device 812 may be configured to buffer a plurality of data packets. In some embodiments, storage device 812 may be externally coupled to a content server (not shown).

Memory 804 may include a suitable operating system (0/S) 814. Operating system 814 essentially may control the execution of other computer programs, such as scheduling, input-output control, file and data management, memory management, and communication control and related services. Logic 816 may include executable code to send service requests to the network controller.

Memory 804 may include any one or combination of volatile memory elements (e.g., random access memory (RAM, such as DRAM, SRAM, SDRAM, etc.)) and non-volatile memory elements (e.g., ROM, hard drive, tape, CDROM, etc.). Moreover, the memory 804 may incorporate electronic, magnetic, optical, semi-conductive, and/or other types of storage media. Note that memory 804 may have a distributed architecture, where various components are situated remotely from one another, which can be accessed by the processing device 802.

The software in memory 804 may include one or more separate programs, each of which comprises an ordered listing of executable instructions for implementing logical functions. In the embodiment shown in FIG. 8, the software in memory 804 may include operating system 814 and logic 816, as explained above. Functionality of logic 816 may be implemented using a single module, or distributed among a plurality of modules.

When logic 816 is in operation, processing device 802 may be configured to execute logic 816 stored within memory 804, to communicate data to and from memory 804, and to generally control operations of logic 816. Logic 816 and O/S 814, in whole or in part, but typically the latter, are read by processing device 802, perhaps buffered within processing device 802, and then executed.

The network controller may include a communication interface suitable for enabling communication (e.g., TCP/IP) of data packets with other network devices 818 of network environment 100 For instance, communication interface may be of a type suitable for communication over an IP network, a coaxial cable network, an HFC network, and/or wireless network, among others.

Figure 9:
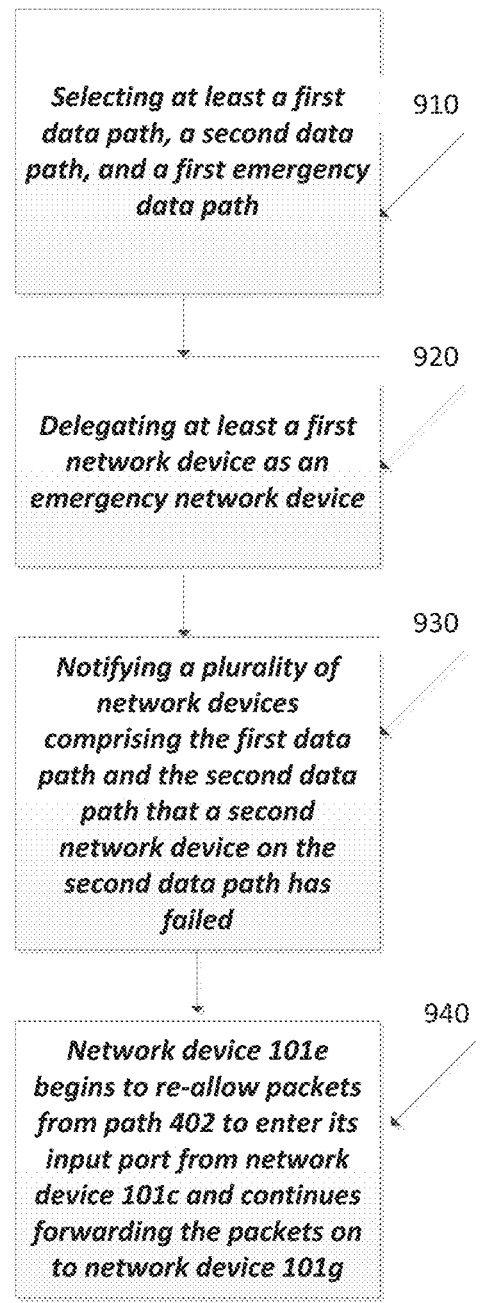
FIG. 9 is a flow chart illustrating embodiments of the present disclosure.

Having described various components of certain embodiments of network environment 100, a method 900 implemented by one or more network devices employed on network environment 100 will now be described with reference to FIG. 9.

Method 900 may begin at step 910 where at least a first data path, a second data path and a first emergency data path may be selected. In the examples described above the first path may be represented by data path 401, the second data path may be represented by data path 402, and the emergency data path may be represented by data path 403 traversing between network device 101f and network device 101g. These paths may be selected by a network administrator or determined through heuristic programming.

Method 900 may then advance to step 920. At step 920, at least a first network device may be delegated as an emergency network device. In the example above, the delegated device corresponds to network device 101f. In some embodiments there may be more than one delegated device. Again, the network device may be delegated by a network administrator or determined through heuristic programming. This delegated device may store information about the emergency data path in local memory.

Upon failure of a network device, such as network device 101e in the example above, method 900 may advance to step 930. At step 930, a plurality of network devices comprising the first data path and the second data path may be notified that a second network device on the second data path has failed. Such notification may occur via ISIS protocol messaging, although embodiments of the present disclosure are adaptable to other suitable messaging protocols.

After the messaging at step 930, method 900 may proceed to step 940. At step 940, copies of network packets received at the emergency network device may be routed to the first emergency network path upon failure notification. After the failure notification failsafe has been activated, the first network device may begin dropping duplicate copies of each data packet. As a result of method 900, after the implementation of the first emergency network path, a destination network device connected to the first data path and the second data path will still receive two copies of each packet originating from a source network device. Once there is confirmation that the failed network device is again operational, use of the emergency network path may be discontinued.

Figure 10:
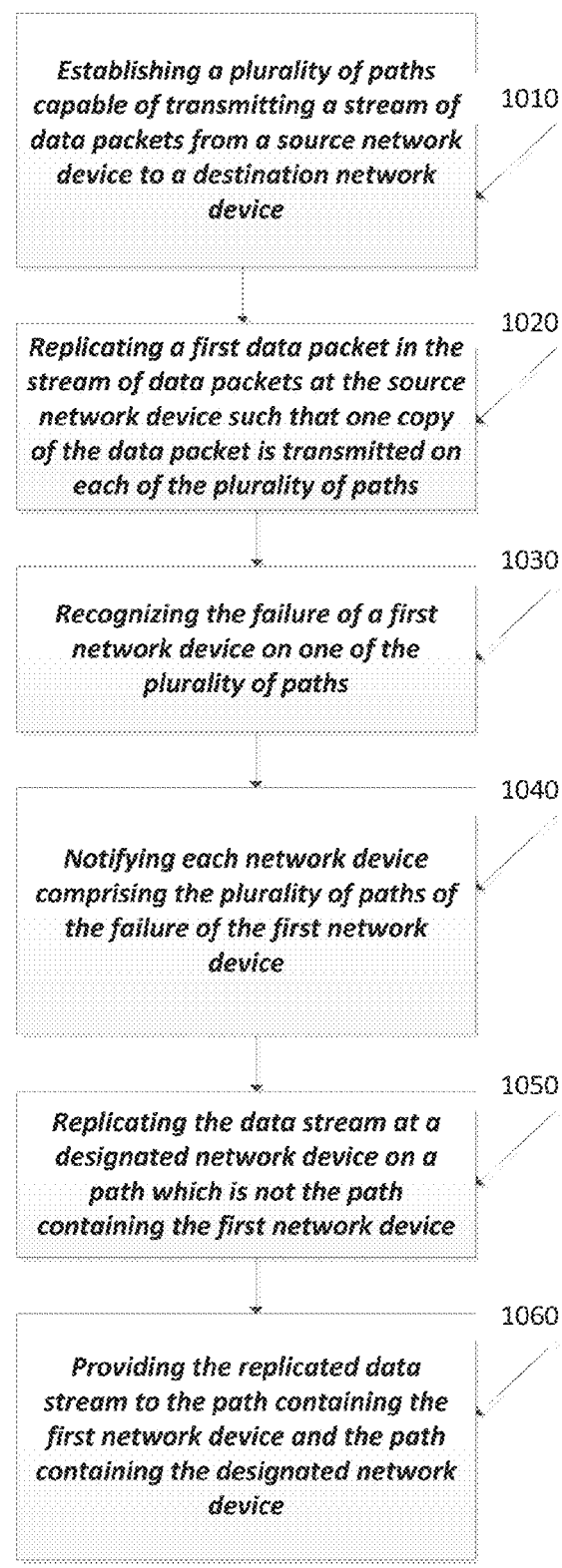
FIG. 10 is a flow chart illustrating embodiments of the present disclosure.

Having described various components of certain embodiments of network environment 100, a method 1000 implemented by one or more network devices employed on network environment 100 will now be described with reference to FIG. 10.

Method 1000 may begin at step 1010 where a plurality of paths capable of transmitting a stream of data packets from a source network device to a destination network device may be established. In normal operation this may allow for at least two copies of each packet in the data stream to be transmitted from a source network device to a destination network device. This is represented in step 1020 where a first data packet in the stream of data packets may be replicated at the source network device such that one copy of the data packet is transmitted on each of the plurality of paths.

Method 1030 may advance to step 1030 when the failure of a first network device on one of the plurality of paths is recognized. The failure of the first network device may occur due to the chance events as described above or through other means that prohibit proper operation of the first network device. Upon failure of the first network device, method 1000 may proceed to step 1040 where each network device comprising the plurality of paths is notified of the failure of the first network device.

After the messaging step, method 1000 may proceed to step 1050. At step 1050, the data stream may be replicated at a designated network device on a path which is not the path containing the first network device. Upon replication, method 1000 may proceed to step 1060 where the replicated data stream is provided to a second network device on the path containing the first network device, wherein the destination device receives the stream of data packets from the path containing the first network device and the path containing the designated network device.

In some embodiments of method 1000, the plurality of paths may reside on a reserved bandwidth network. If that is the case, when the first network device is brought back from a failure state, the steps described in method 700 may be implemented.

Embodiments of the disclosure, for example, may be implemented as a computer process (method), a computing system, or as an article of manufacture, such as a non-transitory computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
   establishing a plurality of paths capable of transmitting a stream of data packets from a source network device to a destination network device, the plurality of paths operating on a reserved bandwidth network;
   replicating a first data packet in the stream of data packets at the source network device such that one copy of the data packet is transmitted on each of the plurality of paths;
   recognizing a failure of a first network device on a first path of the plurality of paths;
   notifying each network device of the plurality of paths of the failure of the first network device;
   replicating the data stream at a designated network device on a second path which does not contain the first network device;
   providing the replicated data stream to a second network device on the first path, wherein the destination device receives the stream of data packets from the first path containing the first network device and the second path containing the designated network device;
   bringing the first network device up from the failure; and
   discarding received data packets at the first network device until the first network device receives a continue message from the second network device.

2. The method of claim 1, further comprising discontinuing receipt at the second device of data packets sent from the designated network device after the first network device is brought up from failure.

3. The method of claim 2, further comprising transmitting the continue message from the second network device to the first network device.

4. The method of claim 3, further comprising continuation of normal operation of the path containing the first network device upon receipt of the continue message.

5. The method of claim 1, wherein notifying each network device of the failure of the first network device comprises notifying using an intermediate system to intermediate system (ISIS) protocol.

6. The method of claim 1, wherein replicating the data stream at the designated network device comprises wherein replicating the data stream at the designated network device in response to receiving the notification of the failure of the first network device.

7. The method of claim 1, wherein providing the replicated data stream to the second network device on the first path comprises providing the replicated data stream over an intermediate path connecting the designated network device and the second device.

8. The method of claim 1, wherein providing the replicated data stream over an intermediate path comprises providing the replicated data stream over a preconfigured intermediate path.

9. The method of claim 1, wherein providing the replicated data stream to the second network device on the first path comprises providing the replicated data stream over an emergency path connecting the designated network device and the second device.

10. A system comprising:
    a source network device;
    a destination network device;
    a first data path connecting the source device and the destination device, the first path comprising a first designated network device; and a second data path connecting the source device and the destination device, the second path comprising a second designated device;

wherein the first data path and the second data path operate on a reserved bandwidth network;

wherein the source device is configured to:
replicate a first data packet in a stream of data packets;
transmit the first data packet on the first data path;
transmit the replicated first data packet on the second data path;

wherein the system is configured to:
detect a failure of a first network device on the first path;
notify each network device of the system of the failure of the first network device;
replicate the data stream at the second designated network device;
provide the replicated data stream to a second network device located on the first path;
bring the first network device up from the failure; and
discard received data packets at the first network device until the first network device receives a continue message from the second network device.

11. The system of claim 10, wherein the system being configured to provide the replicated data stream to the second network device comprises the system being configured to provide the replicated data stream to the second network device on an intermediate path.

12. The system of claim 11, wherein the intermediate path is an emergency path.

13. The system of claim 10, wherein the destination node is configured to receive the first data packet and the replicated data packet.

14. The system of claim 10, wherein the system being configured to notify each network device of the failure of the first network device comprises the system being configured to notify using an intermediate system to intermediate system (ISIS) protocol.

15. The system of claim 10, wherein the continue message is transmitted from the second network device to the first network device.

16. The system of claim 10, wherein the system is further configured to continue normal operation of the first path upon receipt of the continue message.

17. An apparatus comprising:
a memory storage; and
a processing unit coupled to the memory storage, wherein the processing unit is operative to:
establish a plurality of paths capable of transmitting a stream of data packets from a source network device to a destination network device, the plurality of paths operating on a reserved bandwidth network;
replicate a first data packet in the stream of data packets at the source network device such that one copy of the data packet is transmitted on each of the plurality of paths;
recognize a failure of a first network device on a first path of the plurality of paths;
notify each network device of the plurality of paths of the failure of the first network device;
replicate the data stream at a designated network device on a second path which does not contain the first network device;
provide the replicated data stream to a second network device on the first path, wherein the destination device receives the stream of data packets from the first path containing the first network device and the second path containing the designated network device;
bring the first network device up from the failure; and
discard received data packets at the first network device until the first network device receives a continue message from the second network device.

18. The apparatus of claim 17, wherein the processing unit is further operative to transmit the continue message from the second network device to the first network device.

19. The apparatus of claim 17, wherein the processing unit is further operative to continue of normal operation of the path containing the first network device upon receipt of the continue message.

* * * * *